United States Patent Office
2,977,285
Patented Mar. 28, 1961

2,977,285
PROCESS OF PRODUCING GIBBERELLIC ACID
Arthur John Birch, Manchester, and Ian Stewart Nixon and John Frederick Grove, Welwyn, England, assignors to Imperial Chemical Industries Limited, London, England, a corporation of Great Britain No Drawing. Filed Apr. 17, 1959, Ser. No. 807,009
Claims priority, application Great Britain Apr. 23, 1958
1 Claim. (Cl. 195—36)

This invention relates to an improved process of manufacture and more particularly it relates to an improved process for the production of gibberellic acid.

Gibberellic acid is a plant growth stimulant obtainable from culture filtrates of certain active strains of the mould Gibberella fujikuroi (Fusarium moniliforme). It is known from United Kingdom patent specification No. 783,611 to manufacture gibberellic acid by cultivating an active strain of Gibberella fujikuroi in a suitable stirred and aerated nutrient medium containing a source of carbon, nitrogen and certain metallic salts. It is a characteristic of this metabolic process that gibberellic acid is produced for the most part when net protein synthesis or active growth of the mould has been checked by exhaustion of one of the essential constituents for example ammonium nitrate from the nutrient medium.

We have now found, and herein lies our invention, that improved rates of production of gibberellic acid may be obtained by adding to the nutrient medium, during the acid-production stage of the metabolic process, a suitable compound, hereinafter referred to as a precursor, which is utilizable by the mould and is incorporated in whole or in part into the gibberellic acid molecular structure.

Thus according to the present invention we provide an improved metabolic process for the production of gibberellic acid by cultivating an active strain of Gibberella fujikuroi in a nutrient medium and checking active growth to promote gibberellic acid production characterised in that the rate of the said acid production is increased by the addition of mevalonic acid as a precursor to the nutrient medium.

It is to be understood that the said mevalonic acid used as a precursor in the nutrient medium may be present as the free acid (3:5-dihydroxy-3-methyl-n-pentanoic acid) or as a functional derivative thereof. Suitable functional derivatives of the said mevalonic acid may be for example a salt or an ester derived therefrom particularly esters of phosphoric acid, or conveniently the delta lactone, or the corresponding aldehyde (3:5-dihydroxy-3-methyl-n-valeric aldehyde). Other compounds which are known to act in a similar manner to mevalonic acid as precursors and which are also intended to be used as precursors in the present invention are mevaldic acid (3-hydroxy-3-methylglutaraldehydic acid) and isopentenol (2-methyl-4-hydroxy-$\Delta^{1,2}$-butene). Those precursors containing asymmetric carbon atoms may be used either in the form of optically active compounds or in the form of racemic compounds. They may be added continuously or batchwise at intervals to the nutrient medium.

By means of the present invention we have found it possible to initiate higher rates of production of gibberellic acid in a given fermentation medium than would normally be possible for that medium if no precursor was present.

The invention is illustrated but not limited by the following examples:

Example 1

A fermenter containing 5 litres of a sterile medium having the composition:

| | | |
|---|---|---|
| Glucose monohydrate | percent w./v | 5 |
| Ammonium nitrate | do | 0.12 |
| Potassium dihydrogen phosphate | do | 0.5 |
| Magnesium sulphate heptahydrate | do | 0.1 |
| Minor element concentrate [1] | percent v./v | 0.2 |

[1] The composition of the minor element concentrate is as follows:

| | | |
|---|---|---|
| Ferrous sulphate heptahydrate | g | 0.1 |
| Copper sulphate pentahydrate | g | 0.015 |
| Zinc sulphate heptahydrate | g | 0.1 |
| Manganese sulphate heptahydrate | g | 0.01 |
| Potassium molybdate ($K_2MoO_4$) | g | 0.01 |
| Water | ml | 100 | is inoculated with an active strain of Gibberella fujikuroi (samples deposited in the culture collections of the Commonwealth Mycological Institute, Kew, the Bureau voor Schimmelcultures, Baarn, and the Northern Utilization Research and Development Division of the United States Department of Agriculture, Peoria, Illinois, U.S.A.) and is maintained at a temperature of 26.2° C., sterile air being blown into the medium at a rate of 2.5 l./min.

After fermentation had proceeded for 53 hours, two 30 ml. samples of the mycelial culture were used to inoculate two fermenters R and S, each containing 30 l. medium having the composition detailed below:

| | | |
|---|---|---|
| Glucose monohydrate | percent w./v | 10 |
| Ammonium nitrate | do | 0.18 |
| Potassium dihydrogen phosphate | do | 0.5 |
| Magnesium sulphate heptahydrate | do | 0.1 |
| Minor element concentrate [1] | percent v./v | 0.2 |

[1] The composition of the minor element concentrate is that given above.

These fermenters are stirred and maintained at 26.2° C. and air is supplied to them at a rate of 15 l./min.

After fermentation has proceeded for 67 hours, by which time active growth has been substantially checked by exhaustion of nitrogen from the media and gibberellic acid production has commenced, 30 g. of mevalonic acid lactone is added to fermenter R and the equivalent weight of carbon as 33.5 g. of glucose monohydrate is added to fermenter S.

The following table shows the gibberellic acid concentration in the media at specified times after these additions:

| Time (hours) | Fermenter R Gibberellic acid, mg./l. | Fermenter S Gibberellic acid, mg./l. |
|---|---|---|
| 67 | 15 | 5 |
| 71 | 22 | 8 |
| 88 | 65 | 34 |
| 94 | 88 | 41 |
| 99 | 108 | 52 |
| 114 | 146 | 77 |
| 119 | 142 | 96 |
| 125 | 175 | 111 |

From the foregoing table, it will be seen that the average rate of production of gibberellic acid in fermenter R is 2.76 mg./l./hr. whereas the average rate of production of gibberellic acid in fermenter S is 1.83 mg./l./hr. The results indicate that the rate of production of gibberellic acid in fermenter R containing mevalonic acid lactone is considerably greater than the rate of production of gibberellic acid in fermenter S.

*Example 2*

Two fermenters (I and II) each containing 70 litres of a medium having the composition:

| | |
|---|---|
| Glucose monohydrate _____percent w./v__ | 15 |
| Ammonium nitrate _____do____ | 0.4 |
| Potassium dihydrogen phosphate _____do____ | 0.5 |
| Magnesium sulphate heptahydrate _____do____ | 0.1 |
| Minor element concentrate [1] _____percent v./v__ | 0.2 |

[1] The composition of the minor element concentrate is that shown in Example 1.

are inoculated with an active strain of *Gibberella fujikuroi* (samples deposited in the culture collections of the Commonwealth Mycological Institute, Kew, and the Bureau voor Schimmelcultures, Baarn, and the Northern Utilization Research and Development Division of the United States Department of Agriculture, Peoria, Illinois, U.S.A.) and are maintained at a temperature of 26° C., sterile air being blown into the medium at a rate of 35 litres/minute.

After fermentation has proceeded for 137 hours, by which time active growth has been substantially checked by exhaustion of nitrogen from the media and gibberellic acid production has commenced, fermenter II receives a supplement of mevalonic acid lactone amounting to two lots of 15 g. each per 24 hours, from this time to the end of the fermentation, such that a total of 465 g. of mevalonic acid lactone is added to fermenter II.

From time to time throughout the fermentations both fermenters receive supplements of glucose monohydrate such as will maintain the glucose concentration within the fermenters, between the limits 4% and 0.4% w./v.

The following table shows the gibberellic acid concentration in the media at specified times during the fermentation:

| Time (hours) | Fermenter I Gibberellic acid, mg./l. | Fermenter II Gibberellic acid, mg./l. |
|---|---|---|
| 118 | 16 | 3 |
| 160 | 70 | 54 |
| 233 | 286 | 284 |
| 256 | 335 | 341 |
| 280 | 408 | 400 |
| 304 | 482 | 460 |
| 328 | 557 | 623 |
| 400 | 643 | 789 |
| 424 | 594 | 964 |
| 448 | 558 | 796 |
| 472 | 507 | 836 |
| 496 | 518 | 870 |
| 568 | 507 | 1046 |
| 592 | 536 | 1102 |

Fermenter I utilized a total of 28.3% glucose monohydrate and fermenter II a total of 35% glucose monohydrate.

The contents of the fermenters are then filtered and each filtrate is treated with 17 g. carbon to remove gibberellic acid. The carbons are then air dried and treated with aqueous acetone to elute the gibberellic acid which is then recovered from the solutions by means known to the art. There is thus obtained from fermenter I 27.0 g. of gibberellic acid and from fermenter II, 42.4 g. of gibberellic acid.

What we claim is:

An improved metabolic process for the production of gibberellic acid by cultivating an active strain of *Gibberella fujikuroi* in a nutrient medium and checking active growth to promote gibberellic acid production characterized in that the rate of the said acid production is increased by the addition of mevalonic acid lactone as a precursor to the nutrient medium.

References Cited in the file of this patent

UNITED STATES PATENTS

| | | |
|---|---|---|
| 2,842,051 | Brian et al. | July 8, 1958 |
| 2,865,812 | Borrow et al. | Dec. 23, 1958 |
| 2,906,671 | Borrow et al. | Sept. 29, 1959 |
| 2,906,673 | Borrow et al. | Sept. 29, 1959 |